(12) United States Patent
Kapoor et al.

(10) Patent No.: US 11,449,581 B2
(45) Date of Patent: Sep. 20, 2022

(54) FLEXIBLE LICENSE SOURCING AT CUSTOMER SITES

(71) Applicant: Dell Products L.P., Round Rock, TX (US)

(72) Inventors: Karan Kapoor, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 336 days.

(21) Appl. No.: 16/654,554

(22) Filed: Oct. 16, 2019

(65) Prior Publication Data

US 2021/0117513 A1    Apr. 22, 2021

(51) Int. Cl.
  *G06F 21/10* (2013.01)
  *G06F 8/61* (2018.01)
  *G06F 21/51* (2013.01)
  *G06F 21/12* (2013.01)

(52) U.S. Cl.
  CPC ............. *G06F 21/105* (2013.01); *G06F 8/61* (2013.01); *G06F 21/125* (2013.01); *G06F 21/51* (2013.01)

(58) Field of Classification Search
  CPC .... G06F 21/105; G06F 21/121; G06F 21/125; G06F 21/126; G06F 21/128; G06F 21/51; G06F 8/60–71
  USPC .................. 717/120, 121, 168–178
  See application file for complete search history.

(56) References Cited

U.S. PATENT DOCUMENTS

| 7,603,318 B1* | 10/2009 | Colosso | G06Q 30/06 705/51 |
| 2008/0228513 A1* | 9/2008 | McMillan | G06F 21/105 726/2 |
| 2009/0119779 A1* | 5/2009 | Dean | G06F 21/105 726/26 |
| 2020/0074046 A1* | 3/2020 | Raley | G06F 21/10 |

OTHER PUBLICATIONS

Ferrante, Daniel, Software Licensing Models: What's Out There?, IT Professional, vol. 8, Issue: 6, Nov.-Dec. 2006, pp. 24-29, [retrieved on May 23, 2022], Retrieved from the Internet: <URL:http://ieeexplore.ieee.org/>.*
Wikipedia, "Software License," https://en.wikipedia.org/wiki/Software_license, Oct. 6, 2019, 6 pages.
Wikipedia, "Floating Licensing," https://en.wikipedia.org/wiki/Floating_licensing, Jun. 17, 2019, 1 page.
Wikipedia, "License Manager," https://en.wikipedia.org/wiki/License_manager, Sep. 5, 2019, 2 pages.
LABS64 Gmbh, "Licensing Models Tailored to Your Needs," https://netlicensing.io/licensing-models/, 2019, 5 pages.

* cited by examiner

*Primary Examiner* — Geoffrey R St Leger
(74) *Attorney, Agent, or Firm* — Ryan, Mason & Lewis, LLP

(57) ABSTRACT

In a software product installed in a given computing environment, wherein the software product when installed is configured to operate in accordance with a licensing model having a first licensing functionality, a method receives an instruction to modify the licensing model to enable the software product to operate in accordance with a second licensing functionality. The method then automatically modifies the licensing model to enable the software product to operate in accordance with the second licensing functionality.

20 Claims, 12 Drawing Sheets

100

200

500

600

800

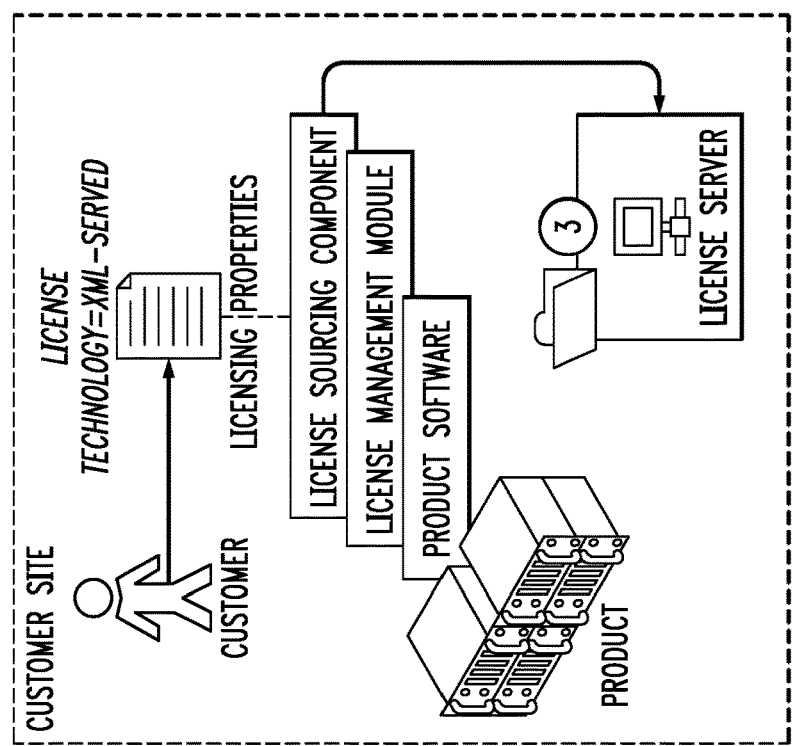
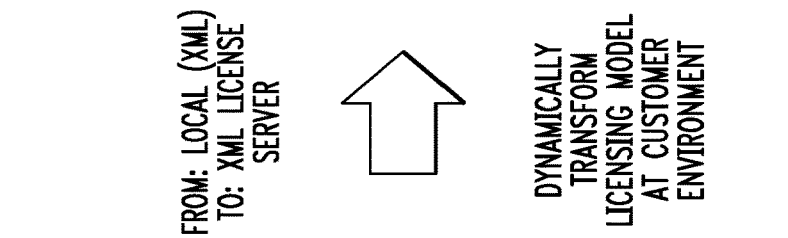
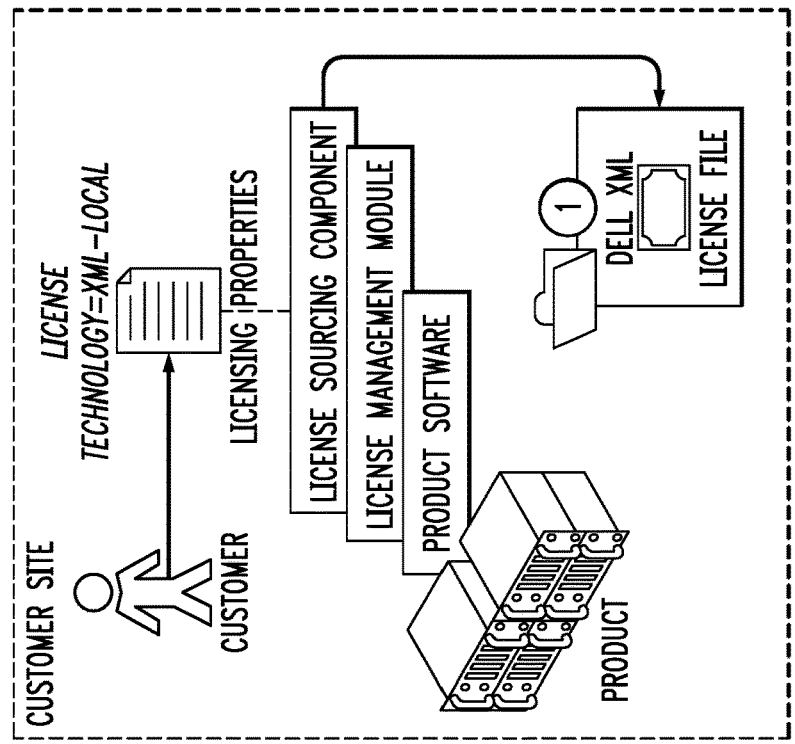
FIG. 9
900

1000

1100

FLEXIBLE LICENSE SOURCING AT CUSTOMER SITES

FIELD

The field relates generally to product management in computing environments, and more particularly to techniques for managing licensing features associated with products in a customer computing environment.

BACKGROUND

Currently, customers can be limited on the flexibility and growth of their computing environments and infrastructure due to the type of licensing model that comes coupled with the software products they purchased. Once a product is installed with the necessary license technology or topology, there is no way to modify the licensing model without the customer requiring a product upgrade. This is because either the product software or the licensing module has to have specific code/instructions to work for a single or subset of pre-determined licensing technologies or topologies.

SUMMARY

Embodiments of the invention provide techniques for product license management in computing environments.

For example, in one embodiment, a method comprises the following steps. In a software product installed in a given computing environment, wherein the software product when installed is configured to operate in accordance with a licensing model having a first licensing functionality, a method receives an instruction to modify the licensing model to enable the software product to operate in accordance with a second licensing functionality. The method then automatically modifies the licensing model to enable the software product to operate in accordance with the second licensing functionality.

In some embodiments, the first licensing functionality and the second licensing functionality relate to two license technologies and/or license topologies.

In some embodiments, a programmed behavior associated with the first licensing functionality and a programmed behavior associated with the second licensing functionality are stored in respective memory blocks. As such, the modifying step further comprises loading the behavior from the memory block associated with the second licensing functionality in response to a call for a transaction associated with the second license functionality, and then executing the behavior loaded from the memory block associated with the second licensing functionality.

Advantageously, illustrative embodiments provide flexible license sourcing at a customer site by externalizing one or more parameters that define the behavior of the system into an external properties file via which the flow of core licensing functions and additional capabilities can be controlled without any code changes in the software product (i.e., without a product upgrade at the customer site being required).

These and other features and advantages of the invention will become more readily apparent from the accompanying drawings and the following detailed description.

BRIEF DESCRIPTION OF THE DRAWINGS

FIG. 9 is a block diagram of a second scenario where a licensing model is dynamically transformed at a customer computing environment, according to an illustrative embodiment.

DETAILED DESCRIPTION

Figure 1:
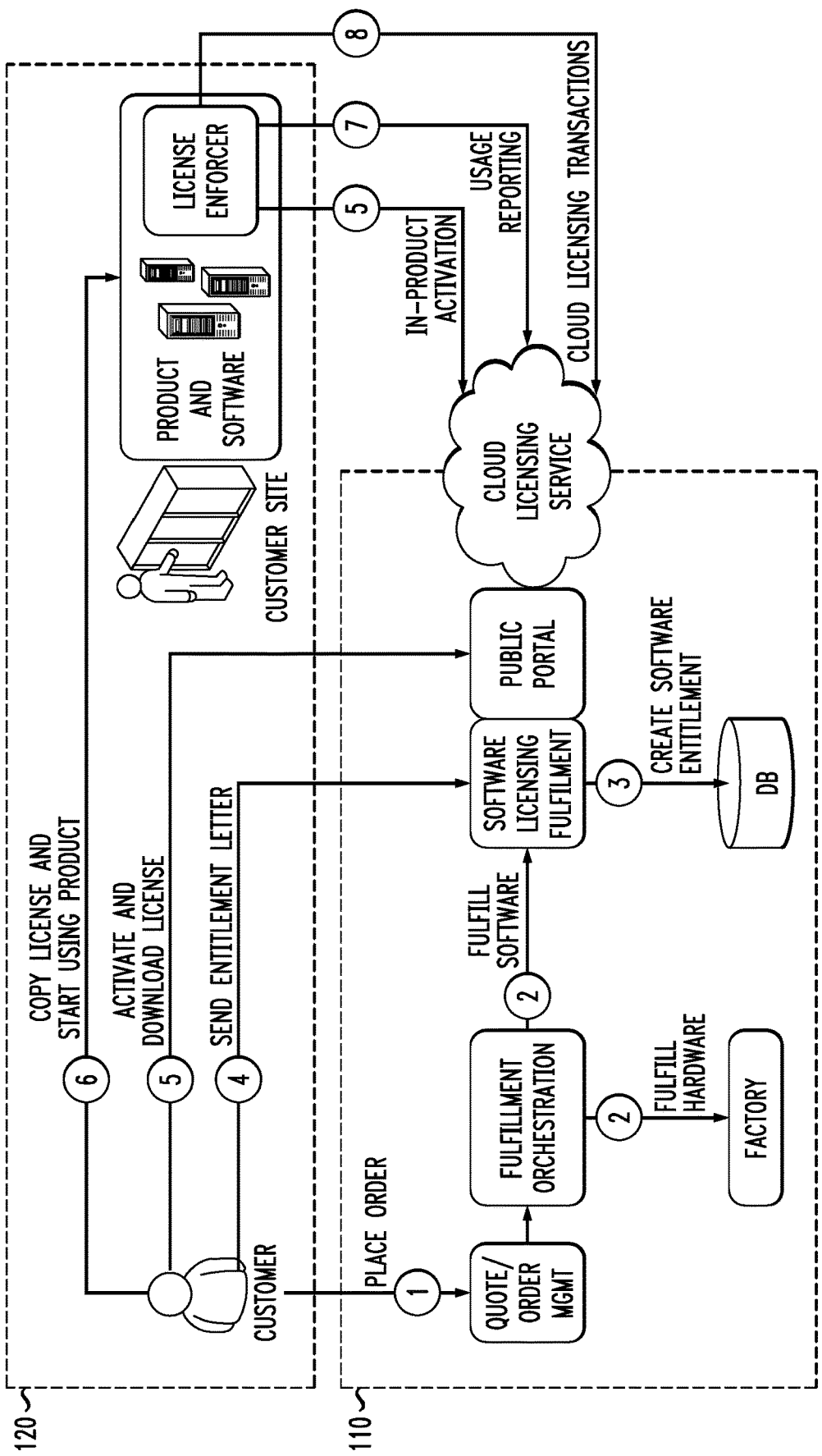
FIG. 1 is a block diagram of an end-to-end licensing lifecycle for a product and customer in which one or more illustrative embodiments may be implemented.

Illustrative embodiments may be described herein with reference to exemplary computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

Currently, any licensing setup at customer sites is tied to the product software that implements it. Thus, a product has written code for a certain type of licensing (e.g., unserved)

that will not work for other license topologies (e.g., served or cloud) or other license technologies (e.g., binary), unless a new version of the product software is provided with that licensing model. Different types of license topologies and license technologies will be described in further detail below.

This product software code runs within the customer sites providing the product features to the customer. However, if a customer now wants to adapt their environment to a different licensing model, they are not able to do that without working with the product supplier (e.g., enterprise) and requesting a product upgrade with that specific change. In this case, the product team in question would need to re-write some part of their code to work in a different licensing model than before.

While explanations below may occasionally mention Dell EMC (Dell Products L.P., Round Rock, Tex.) products and licensing implementation scenarios, it is to be appreciated that embodiments are not limited to such enterprise's products or licensing implementation scenarios.

By way of example only, assume that all the products used by given enterprise customers have common licensing platform (CLP) software development kits (SDKs) embedded in the product software that provides a licensing application programming interface (API) to allow the product teams to control customer's usage of "product features" based on what the customer has purchased and is entitled to.

For example, the customer's usage of the different product features can be:

1. Consumption-based (i.e., used or not used);
2. Capacity-based (i.e., used 200 TB out of available 1000 TB, where TB refers to terabytes); or
3. Quantity-based (i.e., used 3 counts out of available 5).

The CLP application provides a suite of APIs within SDK kits (C and Java) to all product teams within the given enterprise for them to integrate licensing into their products and achieve finer grained control over which product features to enable for each end-customer.

The CLP licensing API enables enforcement of the licensed product features by reading it off a digitally signed Extensible Markup Language (XML) license file that contains information about the available product features that the customer can use.

The license information is typically stored in a license file at the customer site, however, with upcoming newer implementations of different license technologies and topologies, there is a need for allowing end-customers to upgrade to newer and modern versions of license technologies (such as, by way of example only, software-as-a-service (SAAS)/cloud licensing).

Additionally, there is also a need to enable end-customers (predominantly enterprise customers) to adopt newer license topologies (e.g., moving from unserved to served/floating licensing model) that may be required as they need to grow their servers and storage infrastructure base.

As used herein, the terms below are illustratively defined as follows:

"License Topology" refers to the way licensing is setup at the customer site. Examples:
  Unserved=local license files on each server/appliance.
  Served=centralized licensing manager setup on customer site to enable licensing on different remote customer nodes within customer site/network.

"License Technology" refers to the format or technology of the license information that is stored or retrieved. Examples:
  XML=Enterprise-proprietary (e.g., Dell EMC) XML license file format.
  3rd Party=currently only supports 3rd party Flexera license file format.
  JSON=usually the license format that is provided by an enterprise license server (served) or enterprise cloud licensing capability (cloud). Schema is same as enterprise-proprietary XML format.
  Binary=encrypted/secure binary representation of enterprise-proprietary XML format.
  Cloud (XML or JSON)=licensing capability provided as a service on enterprise cloud as a service (SAAS) for connected customers. Default uses JSON format but can be used for XML as well. Also, it can be used along with an additional property to specific served and unserved topologies to utilize served and unserved cloud offerings respectively of the enterprise.

"License Sourcing Attributes" or "Licensing Model" refers to a combination of license topology and technology implemented within a customer site.

Today, enterprise product teams are not able to enable customers (sometimes interchangeably referred to herein as "end-customers") to adopt newer license technologies (e.g., XML, JSON, Binary, 3rd Party) or license topologies (e.g., unserved, served, cloud) without providing upgrades.

In order to provide more value to product teams and end-customers, it is a core requirement for licensing capabilities and topologies to change over time while incorporating new features and enhancements. Many of these enhancements would align with a given product's growth path and this cannot be done today without putting in significant effort in working through a development and qualification lifecycle to provide an upgrade to the end-customer that they will have to manually install to obtain new capabilities.

With the current licensing solution in companies, product teams do not have the ability to dynamically modify and control licensing capabilities at customer sites and enable their infrastructure growth needs (e.g., license topology and technology changes) without an upgrade.

A few non-limiting example customer use-cases (problem scenarios) that can benefit from the solutions described herein are as follows:

1. Disconnected to Connected: Assume a customer has purchased and installed a computing environment product from a given enterprise for use within the customer site which is disconnected (within firewall and not open to internet). Now assume the customer wants to adopt cloud licensing from the enterprise and migrate away from local licensing. This cannot be done without a product upgrade today.

2. Unserved to Served: Assume a customer has purchased and is using an unserved model (i.e., local licensing) for a product within the customer site. However, with recent infrastructure growth, assume they want to adopt a served/floating licensing model where they need additional capabilities such as sharing a data storage or data protection appliance across multiple servers (where different servers are able to consume some TB from the total pool of TB and release when done).

3. License Format Change: Assume an existing customer of a given enterprise uses Flexera license files for license enforcement of product features. Now if the enterprise needs its customers to migrate to another license technology such as XML licensing, they cannot do that without creating a new product version and delivering the upgraded product software to all end-customers.

Illustrative embodiments comprise a flexible license sourcing solution that provides an abstraction for product teams from internal workings of licensing transactions while maintaining a consistency in the lifecycle of usage and enforcement of licensing on products. The product teams using this solution are abstracted from core logic of licensing transactions that may differ for different license technologies. This absolves product engineering teams from worrying about licensing implementations and instead focus on only core product functionality.

The flexible license sourcing solution is achieved, in illustrative embodiments, by a license sourcing component (e.g., in the form of an SDK) that resides within the product software.

Further, the flexible license sourcing solution allows dynamic changes to license technology and license topology which is the crux of the solution. In some embodiments, this is accomplished by externalizing certain parameters that define the behavior of the system into an external properties file via which the flow of the core licensing functions and additional capabilities can be controlled without any code changes. This property file is configurable via an intuitive user interface (UI) that provides the ability to configure and modify different types of licensing models that best suits identified needs and best fits into environmental constraints.

Still further, the flexible license sourcing solution enables end-customers to easily select between different supported licensing models (=license format and topology) without changes to existing product software or hardware.

In accordance with illustrative embodiments, customers are able to configure between the following licensing models based on the combinations of the below properties in the "licspec.properties" file (license specifications properties file):

license.topology=Unserved, Served
  license.technology=XML, JSON, Binary, $3^{rd}$ Party, Cloud-XML, Cloud-JSON, Buffered (manually entered via UI)
  If cloud used→license.cloud.sharing=true/false In some illustrative embodiments, the following combinations exist for possible licensing models for the customer to configure:

1. Unserved+XML=local xml license file on each server.
2. Unserved+JSON=local json license file on each server.
3. Unserved+Binary=local binary license file on each server.
4. Unserved+Buffered=local manually entered license string via UI on each server.
5. Unserved+$3^{rd}$ Party=local $3^{rd}$ party (Flexera) license file on each server.
6. Unserved+Cloud-XML=Direct cloud connection to SAAS from each server with XML-based communication.
7. Unserved+Cloud-JSON=Direct cloud connection to SAAS from each server with JSON-based communication.
8. Unserved+Cloud-XML+CloudSharing=true=Direct cloud connection to SAAS from each server with XML-based communication. With cloud sharing enabled, the cloud SAAS licensing service acts as a remote license server across all nodes (individual servers) that connect to it and manage license sharing across all nodes.
9. Unserved+Cloud-JSON+CloudSharing=true=Direct cloud connection to SAAS from each server with JSON-based communication. With cloud sharing enabled, the cloud SAAS licensing service will act as a remote license server across all nodes (individual servers) that connect to it and manage license sharing across all nodes.
10. Served+XML=common license server managed XML license file at customer site
11. Served+JSON=common license server managed JSON license file at customer site
12. Served+Binary=common license server managed Binary license file at customer site
13. Served+Buffered=common license server managed Buffered license file at customer site
14. Served+$3^{rd}$ Party=common license server managed $3^{rd}$ party (Flexera) license file at customer site
15. Served+Cloud-XML=(Delegated SAAS/Cloud) acts as a special configuration where the common license server manages a direct remote connection to cloud SAAS licensing to retrieve license information in XML format for the customer site, and acts as a delegated SAAS provider for the customer site. The delegated model is typically useful for enterprises that want to limit the number of public internet connections from within their intranet (network) which is done by streamlining all internet connectivity through their firewall via a single server residing in a DMZ zone. Note that a DMZ (demilitarized zone) typically refers to a physical or logical subnetwork that contains and exposes an enterprise's external-facing services to an untrusted network, usually a larger network such as the internet.
16. Served+Cloud-JSON=(Delegated SAAS/Cloud) acts as a special configuration where the common license server manages a direct remote connection to cloud SAAS licensing to retrieve license information in JSON format for the customer site, and acts as a delegated SAAS provider for the customer site.
17. Served+Cloud-XML+CloudSharing=true=(Delegated SAAS/Cloud) acts as a special configuration where the common license server manages a direct remote connection to cloud SAAS licensing to retrieve license information in XML format for the customer site, and acts as a delegated SAAS provider for the customer site. With cloud sharing enabled, the SAAS licensing service acts as a remote license server across all nodes (license servers) that connect to it and manage license sharing across all nodes. In this case, the cloud service acts as a remote license server across all license servers connected to it across all customer sites.
18. Served+Cloud-JSON+CloudSharing=true=(Delegated SAAS/Cloud) acts as a special configuration where the common license server manages a direct remote connection to cloud SAAS licensing to retrieve license information in JSON format for the customer site, and acts as a delegated SAAS provider for the customer site. With cloud sharing enabled, the cloud SAAS licensing service acts as a remote license server across all nodes (license servers) that connect to it and manage license sharing across all nodes. In this case, the cloud service acts as a remote license server across all license servers connected to it across all customer sites.

A main intent here is to provide all known license technologies that can provide enough variations to the customer for their environment to be flexible with respect to licensing functionalities.

When the license topology and/or technology properties are modified by the user, the behavior of the licensing module (and hence the product) will dynamically change because the license sourcing component works by dynamically pointing to and loading context from different function blocks to accomplish each change=license format parsing and license topology redirection.

In some illustrative embodiments, this is accomplished by using dependency injection in the Java SDK, and using function callbacks in the C SDK. Each behavioral entity of the system, i.e., way to parse license format, or a way to connect to source the license file, exists as objects (in Java) or pointers (in C) within the application memory. And whenever a modification happens, the correct object or pointer is injected into the calling blocks of the application to enable the dynamic behavior.

In some illustrative embodiments, the license sourcing component SDK contains a built-in graphical user interface (GUI) that provides customers with a simplified portal to control the licensing model.

For example, features of the portal include but are not limited to:

1. Select/Modify "License Topology" from pre-configured list;

2. Select/Modify "License Technology" from pre-configured list;

3. Test Licensing Model change (=e.g., check internet connectivity and try to load license file);

4. Load and show license features/keys based on newly selected "License Technology" (i.e., pull license keys from source)

5. Buffered=Allow the ability to copy-paste in new license file content that is generated from a Software Licensing Central (SLC) website (of the enterprise) specifically to allow for disconnected/dark sites to use "XML-Buffered" license technology.

Note that XML license files for an enterprise can be digitally signed, which means that they are safe from any tampering at customer environments. If changed without signing again, the signatures will not match and the entire license file will be invalidated.

Some further assumptions include:

1. The flexible license sourcing solution works for customer sites/environments that have the latest version of CLP SDK and that use the license sourcing component SDK packaged within the product software. Existing customer environments that have older versions of product software will not provide this flexible licensing capability since this product software was built with an older version of CLP SDK.

2. Depending on how product software has implemented licensing, there may be a restart required to the product software:

Case a: if product software has loaded the license features/keys during boot-time and then just enabled/disabled part of the product software based on that during start-up itself, then the product software would either need to have code/instructions to reload the license content by checking for changes periodically, or it would require a restart.

Case b: if product software is using licensing dynamically on customer-initiated actions (e.g., the customer clicks something to use say 100 TB of capacity, or the customer tries to access a product feature), then this solution works without a restart to the product software.

A recommended way to use licensing would be "case b", however, the way in which to utilize license keys to control product behavior is a decision of product engineering teams and their product features.

3. Modifying the "license.topology" or "license.technology" configuration property is a manual activity that when required is performed by the end-customer's server/platform team managing the data centers, with the help of customer licensing support of the given enterprise (on an as-needed basis).

In some illustrative embodiments, the feature is automated by having an updater module that communicates with an updater service (only for "connected" customer sites) which provides changes to the license technology and topology for a given customer site, along with the new license file. This provides the ability to product and support teams to remotely configure customer environments on their request. For "disconnected" or "dark" customer-sites, this is a manual activity performed by the customer.

Examples of customer configurations with the flexible license sourcing solution for the above-mentioned use-cases include but are not limited to:

1. Disconnected to Connected:

Case: Server A is Disconnected (i.e., no internet access) and now customer wants to use Cloud Licensing.

Solution(s):
a) Change licensing model on server A from "Unserved XML" to "Unserved Cloud-XML" and open necessary firewall ports for Server A.
b) Change licensing model on server A from "Unserved XML" to "Served Cloud-XML" (=delegated SAAS) and install a license server on Server B (which is in DMZ) to act as the delegated SAAS provider (which will connect to Cloud APIs for SAAS licensing).
c) Change licensing model on server A from "Unserved XML" to "Served Cloud-JSON" and open necessary firewall ports for Server A which will allow server A to be part of an enterprise-managed license server for this specific customer site.

2. Unserved to Served:

Case: Server A and multiple other servers are using unserved licensing (i.e., local license file) and now the customer wants them to use a shared licensing model (i.e., served licensing).

Solution(s):
a) Change license sourcing attributes on server A and other servers from "Unserved XML" to "Served XML" and install a license server on Server B (which is also in same private subnet) where license file is stored locally on the license server machine.
b) Change license sourcing attributes on server A and other servers from "Unserved XML" to "Unserved Cloud-XML" and open necessary firewall ports for Server A.
c) Change license sourcing attributes on server A and other servers from "Unserved XML" to "Served Cloud-XML" and install a license server on Server B (which is in DMZ) to act as the delegated SAAS provider (which will connect to Dell EMC Cloud APIs for SAAS licensing).

3. License Format Change:
Case: Server A is using 3rd Party License File and now customer wants to switch over to XML License Files.
Solution(s):
 a) Change license sourcing attributes on server A from "Unserved FLX" to "Unserved XML" and copy the XML License File to the licensing location.
 b) Change license sourcing attributes on server A from "Unserved FLX" to "Unserved Binary" and copy the Binary License File to the licensing location.
 c) Change license sourcing attributes on server A from "Unserved FLX" to "Unserved Buffered" and hardcode the XML License File into the local UI.
 d) Change license sourcing attributes on server A from "Unserved FLX" to "Served Buffered" and hardcode the XML License File into the license server UI.

It is realized herein that there are no existing solutions that allow for direct enhancements at end-customer-sites on license technology/topology for the use-cases mentioned above, as well as others, with just a configuration change that modifies the licensing behavior at the customer environment dynamically.

To summarize from a customer-scenario perspective:
 1. There is no solution today to allow customers to move between disconnected and connected licensing dynamically (without product upgrades).
 2. There is no solution today to allow customers to toggle between unserved and served licensing dynamically (without product upgrades).
 3. There is no solution today to enable dynamic changes to licensing format directly at customer sites dynamically (without product upgrades).

Reference is now made to FIGS. 1-13 which illustrate embodiments with features described above.

FIG. 1 is block diagram of an end-to-end licensing lifecycle 100 for a product customer in which one or more illustrative embodiments may be implemented. As shown in the end-to-end licensing lifecycle 100, reference numeral 110 refers to the enterprise (product manufacturer and/or supplier) and reference numeral 120 refers to the customer site (e.g., computing environment of the customer where the subject product is installed). It is assumed that communication between the customer and enterprise is over one or more electronic communication networks. The product, or at least a software portion of the product, can also be downloaded by the customer over the one or more electronic communication networks. Note that FIG. 1 illustrates one example of an end-to-end licensing lifecycle, however, embodiments are not limited to this example.

As shown, it is assumed a customer places an order (step 1) with a particular enterprise for a particular product manufactured or otherwise supplied by the enterprise. In this example, the product can be a software only product or a hardware product with associated software. The enterprise fulfills the order (step 2) in terms of software, and hardware if any. Software licensing fulfillment involves creating a software entitlement (step 3) which is sent to the customer (step 4). The customer then activates the product and downloads the license for the product in conjunction with the enterprise (step 5). It is assumed the product with software is installed in the customer site for use by the customer (step 6). Usage reporting (step 7) and cloud licensing transactions (step 8), assumed in this example to be associated with a cloud licensing model, occur as the customer uses the product consistent with any licensed features.

Figure 2:
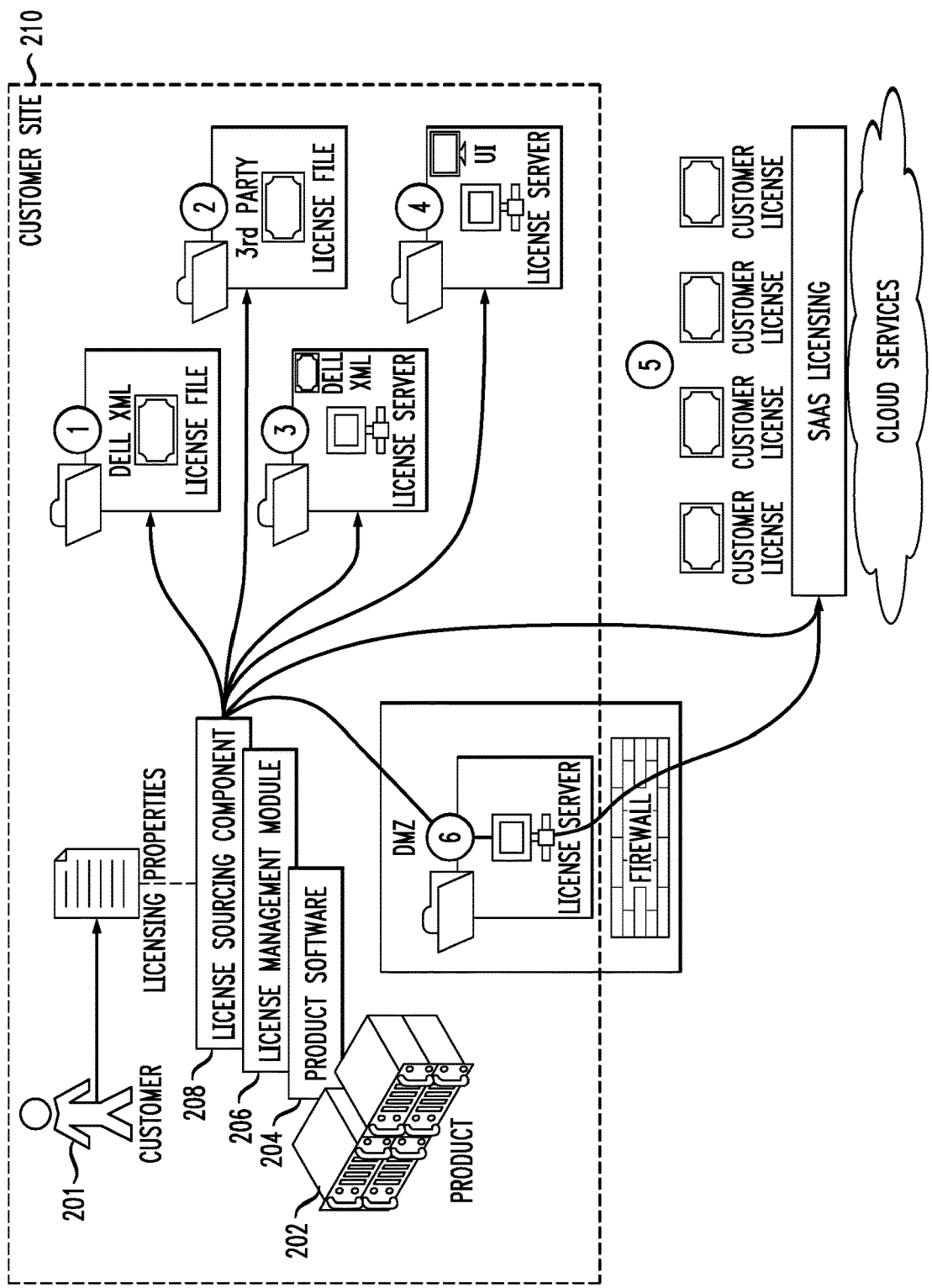
FIG. 2 is a block diagram of an architecture for providing dynamic license sourcing in a computing environment, according to an illustrative embodiment.

FIG. 2 is block diagram of an architecture 200 for providing dynamic license sourcing in a computing environment, according to an illustrative embodiment. In this example, it is assumed that customer 201 has already obtained product 202 which comprises product software 204, a license management module 206, and a license sourcing component 208. The product 202 is assumed to be installed at customer site 210. FIG. 2 further depicts six different licensing models 1 through 6 that the license sourcing component 208 enables customer 201 to transition between. For example, as shown, licensing model 1 comprises license topology=unserved/local and license technology=XML license, licensing model 2 comprises license topology=unserved/local and license technology=$3^{rd}$ party license (e.g., Flexera), licensing model 3 comprises license topology=served/shared and license technology=XML license, licensing model 4 comprises license topology=served/shared and license technology=buffered, licensing model 5 comprises license topology=unserved/local and license technology=cloud/SAAS, and licensing model 6 comprises license topology=served/shared and license technology=cloud/SAAS. It is to be understood that many other licensing models that are not expressly depicted are contemplated in accordance with alternative embodiments.

Figure 3A:
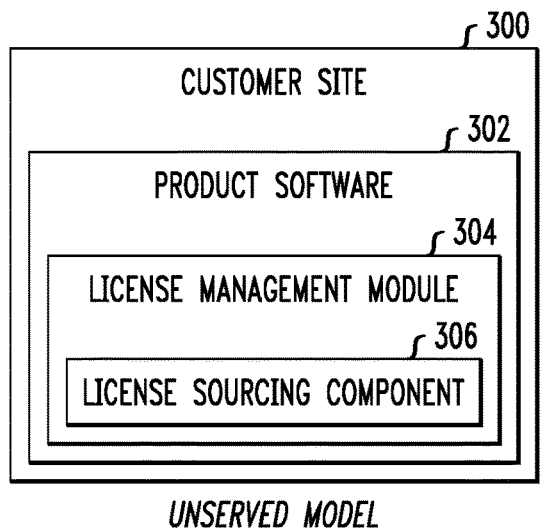
FIGS. 3A and 3B are block diagrams depicting how a license sourcing component can be incorporated into a customer computing environment, according to illustrative embodiments.
Figure 3B:
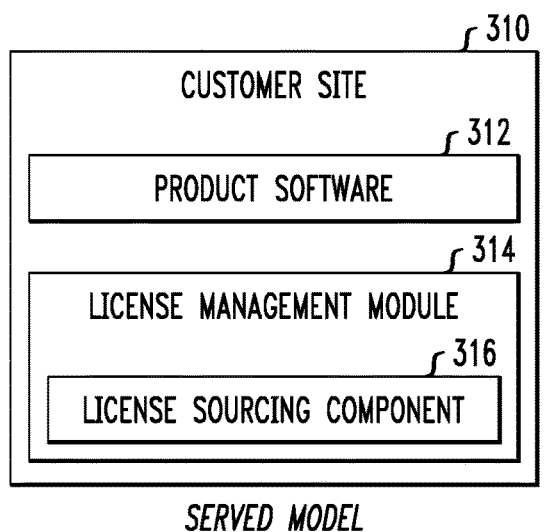

FIGS. 3A and 3B are block diagrams of a license sourcing component in a customer computing environment, according to an illustrative embodiment. More particularly, as shown in FIG. 3A, computing environment denoted as customer site 300 has a product software 302 installed therein. The product software 302, in addition to whatever modules and components it has for performing computing and/or storing functionalities associated with the computing environment, also comprises a license management module 304 which has a license sourcing component 306 resident therein.

One example of a license management module 304 is a common licensing platform (CLP) in the form of an SDK embedded in the product software that provides a licensing API to allow enterprise product teams to control customer's usage of product features based on what the customer has purchased and is entitled to. Thus, the CLP provides licensing and usage capabilities. However, existing license management modules, such as an existing CLP, do not provide for selection and automated modification at the customer site of the licensing model under which the product operates.

In accordance with illustrative embodiments, license sourcing component 306 is resident within the license management module 304 (e.g., CLP SDK) and provides the flexibility to the customers to dynamically switch between the type of license technology and license topology (i.e., licensing model) for their environments without any downtime and without any changes required on product software 302.

FIG. 3B shows that the license management module that contains the license sourcing component can reside outside of the product software as well (for served licensing scenarios, as compared to the unserved model in FIG. 3A). More particularly, a computing environment denoted as customer site 310 has a product software 312 installed therein. The product software 312, in addition to whatever modules and components it has for performing computing and/or storing functionalities associated with the computing environment, also has associated therewith (but not necessarily resident therein) a license management module 314 which has a license sourcing component 316 resident therein.

Note that licensing referred to in these examples is more focused towards the enterprise segment utilizing feature-based licensing and not primarily towards consumer segment licensing. This is because consumer segment licensing does not require complex licensing models (formats or topologies). However, alternative embodiments are not limited to the licensing types illustratively described herein.

Figure 4:
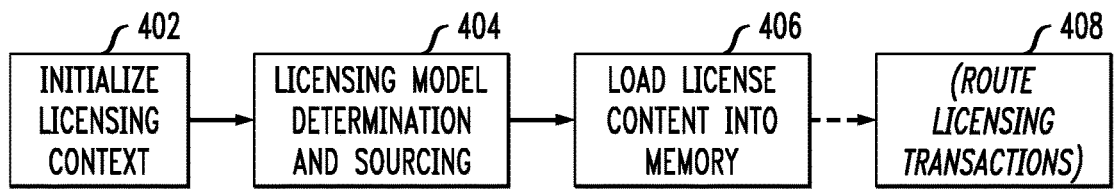
FIG. 4 is a flow diagram of a license sourcing component flow, according to an illustrative embodiment.

FIG. 4 is a flow 400 of a license sourcing component, e.g., 306 in FIG. 3, according to an illustrative embodiment is shown.

As shown, in step 402, the license sourcing component 306 initializes a licensing context. In some embodiments, this step comprises loading license.topology and license.technology properties (see examples above) from a licensing properties file. License technology and topology can be configured by a customer using the UI that is provided or manually which essentially changes a property in a license management module (e.g., 304 in FIG. 3) primary properties file called licspec.properties. If not explicitly set, the license management module tries other criteria to determine the topology and technology at the customer environment. Below is one example set of sub-steps for step 402:

Load explicitly declared license topology and technology (=configurable via UI)
license.technology={SAAS, XML, Buffered, $3^{rd}$ Party}
license.model={Unserved/Local, Served/Shared}
Load explicitly declared license path locations (=configurable via UI)
license.path=/u02/license/location1/u02/license/location2, /u02/license/location3 . . .
Load explicitly declared configurations (=configurable via UI)
license.served.host={license-server}
license.served.proxy={proxy host:port if applicable}
license.served.client-id
license.served.client-secret
Load internally declared configurations (=NOT configurable via UI)
license.dell-cloud.url
license.dell-cloud.public-key
license.dell-cloud.client-id
license.dell-cloud.client-secret Note that vulnerable properties such as client-secret would normally be secured using a lockbox.

Licensing model determination and sourcing is performed in step 404. The license sourcing component uses a licensing model determination and sourcing algorithm to find the license information. Below is one example of sub-steps of a licensing model determination and sourcing algorithm associated with step 404:

Block (A):
Try to determine best possible licensing model as per available parameters and pre-defined prioritization rules:
If "license.technology" and "license.topology" are explicitly set, then load context as per those and quit process. If failed, fallback to next steps
If "license.topology" is set but not "license.technology", then:
If "Served" or "Shared", connect to remote license server and execute block B (if connection fails, or license not found, fallback to Unserved)
If "Unserved" or "Local", perform block B steps on local machine.
If "license.technology" is set but not "license.topology", then assume "Unserved" as default topology, and fallback to "Served" only if license server connectivity parameters are existing in configuration properties, or else fallback to "Unserved Buffered"
If both are not set, then first run block B with "Unserved", and as fallback run block B with "Served"
If none of the above steps result in successful setting of licensing model context and loading of license file, then do block C as Unserved Block (B):
Check for internet connectivity (i.e., ping Dell cloud url)
If available, then mark "Connected" as "true"
Try to find license in Dell Cloud using pre-loaded configuration, if available then load license (validate digital signature) and quit process
Check for local license (i.e., check for known formats on local server)
If "license.path" is mentioned, then search there and include current working directory
If not found, then search across all directories from root drive for all known formats (i.e., *.xml, *.lic, *.dell)
If found then load license (validate digital signature) and quit process
(If Served) do block C Block (C):
If nothing works, then use local Licensing UI to source license file as "Buffered License" (i.e., license as a string buffer that can be copy-pasted manually by the Customer on the Licensing UI)—License string must be generated by Dell-EMC and this will be validated using the digital signature within the license file.

In step 406, source license files (license content) from the appropriate location determined by the licensing model determination and sourcing algorithm is loaded by the license sourcing component. More particularly, in one example, once a license is found in a valid location and validated, then the following sub-steps are performed in accordance with step 406:

Set licensing context with validated license topology and license technology (i.e., this is used during runtime licensing transactions to route program flow to the appropriate licensing behavior).
Read the license keys and other metadata from within the file into memory.
Once loaded, maintain license file content within context of license management module and continue further operations within the same context until "resetLicenseSource( )" function is called, or, license management module is restarted.

Figure 5:
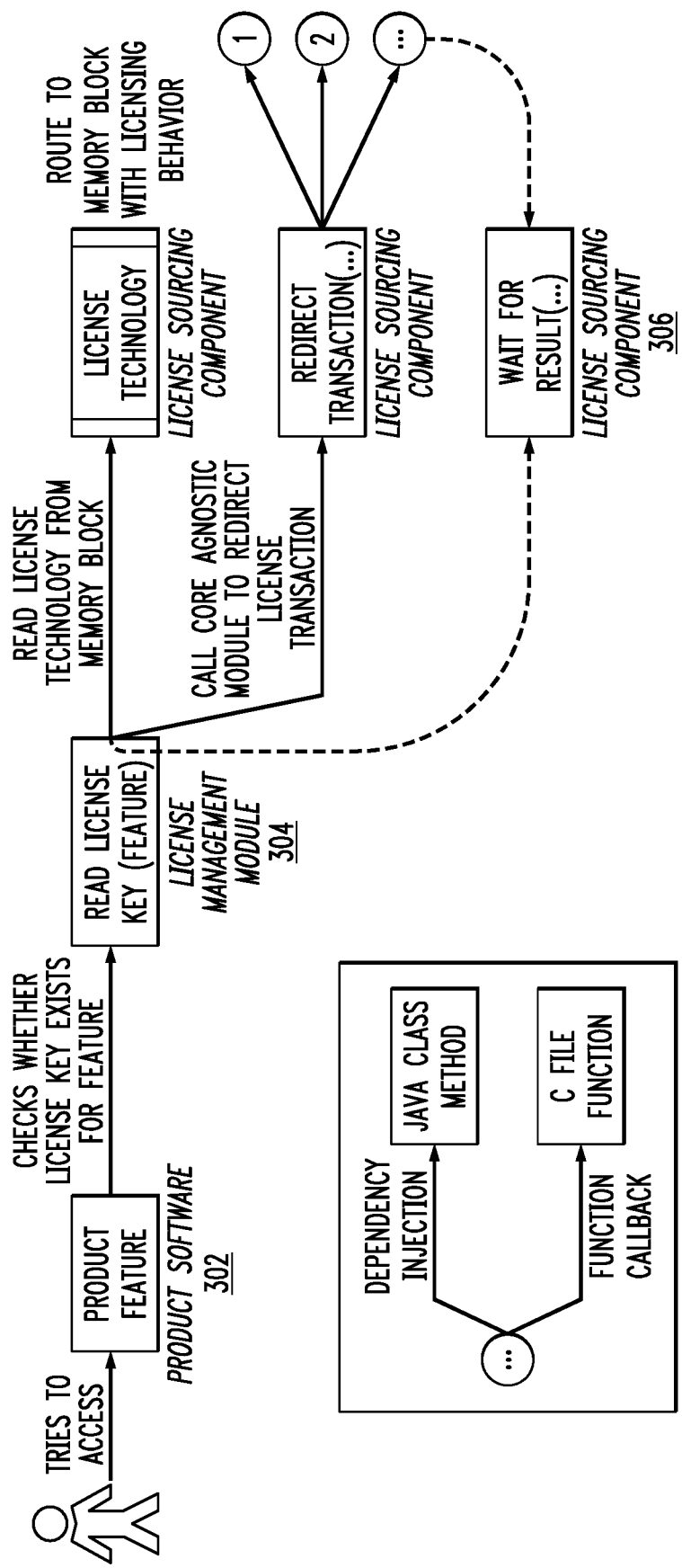
FIG. 5 is a flow diagram depicting how license sourcing works for a single licensing transaction, according to an illustrative embodiment.

In step 408, all licensing calls for routing are routed to appropriate application behavior functions based on the determined license technology. Licensing transactions from the license loaded into context during sourcing are then processed. FIG. 5 shows an example of a licensing transaction 500 with reference to product software 302, license management module 304, and license sourcing component 306. Examples of sub-steps of step 408 are as follows:

Different licensing technology behaviors exist in discrete memory blocks within the license sourcing component 306 (as shown in FIG. 5).
When an application is initialized, a license technology determination algorithm is executed.
Once license technology is determined, the resulting memory block that stores the behavior of this technology is loaded/called whenever a licensing transaction is carried out.

For example: If License Technology is determined as "XML-Local" and if a "readLicenseKey(feature)" function is called within the licensing SDK→then the license sourcing component points to the respective memory block allocated for "readLicenseKey (feature)" for "XML-Local" that is within a "licensing-agnostic-core" module.

This is done by using dependency injection in Java, and callback functions in C—where the respective objects or functions in memory are pointed to dynamically based on application context.

Advantageously, as per flow 400, license sourcing component 306, initially configured to perform a first licensing functionality (e.g., a first licensing model), receives a modification instruction to enable performance of a second licensing functionality (e.g., a second licensing model). The product is then automatically modified to perform the second licensing functionality, e.g., perform licensing transactions associated with the second licensing model.

Figure 6:
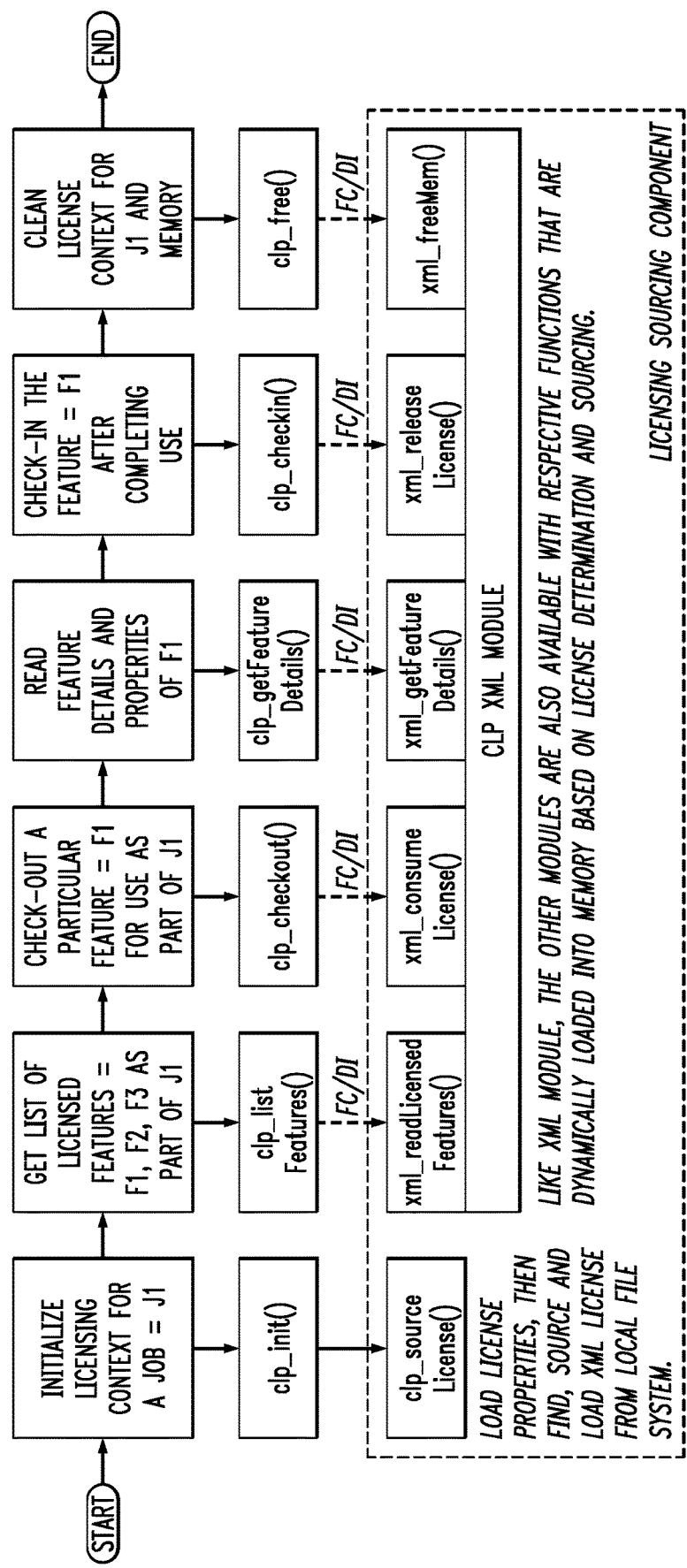
FIG. 6 is a flow diagram of an end-to-end flow for a feature-based licensing management implementation for a first scenario, according to an illustrative embodiment.

FIG. 6 depicts an end-to-end flow 600 for a first licensing management implementation, according to an illustrative embodiment. More particularly, end-to-end flow 600 is for license.technology="XML" and license.topology="Unserved". The example licensing transaction flow gives context of how licensing is used by product teams, and how different behaviors are executed based on license technology and topology.

The licensing transactions illustrated in flow 600 is initiated by calling the clp_init( ) function that represents an initialization and license sourcing behavior that is depicted in FIG. 4. Once initialized, the context/handle within which the license sourcing was performed will be used for all future licensing transactions until the clp_free( ) function is called that depicts the behavior of closing the context/handle. These licensing transactions go through the dynamic license routing behavior depicted in FIG. 5 where function calls are routed to correct memory blocks using dependency injection in Java or function pointer callbacks in C. The licensing transactions normally comprise clp_listFeatures( )=listing existing features or licenses, clp_checkout( )=consuming a specific quantity from a license key, clp_getFeatureDetails( )=reading the properties of the consumed license key, clp_checkin( )=releasing a license key after product is finished consuming that feature. Note that FIG. 6 is intending to illustratively depict the most generally used licensing transactions and hence embodiments are not limited to the functions depicted in the diagram. In this specific example, the Unserved XML licensing is initialized and sourced where the XML license file is sourced locally.

Figure 7:
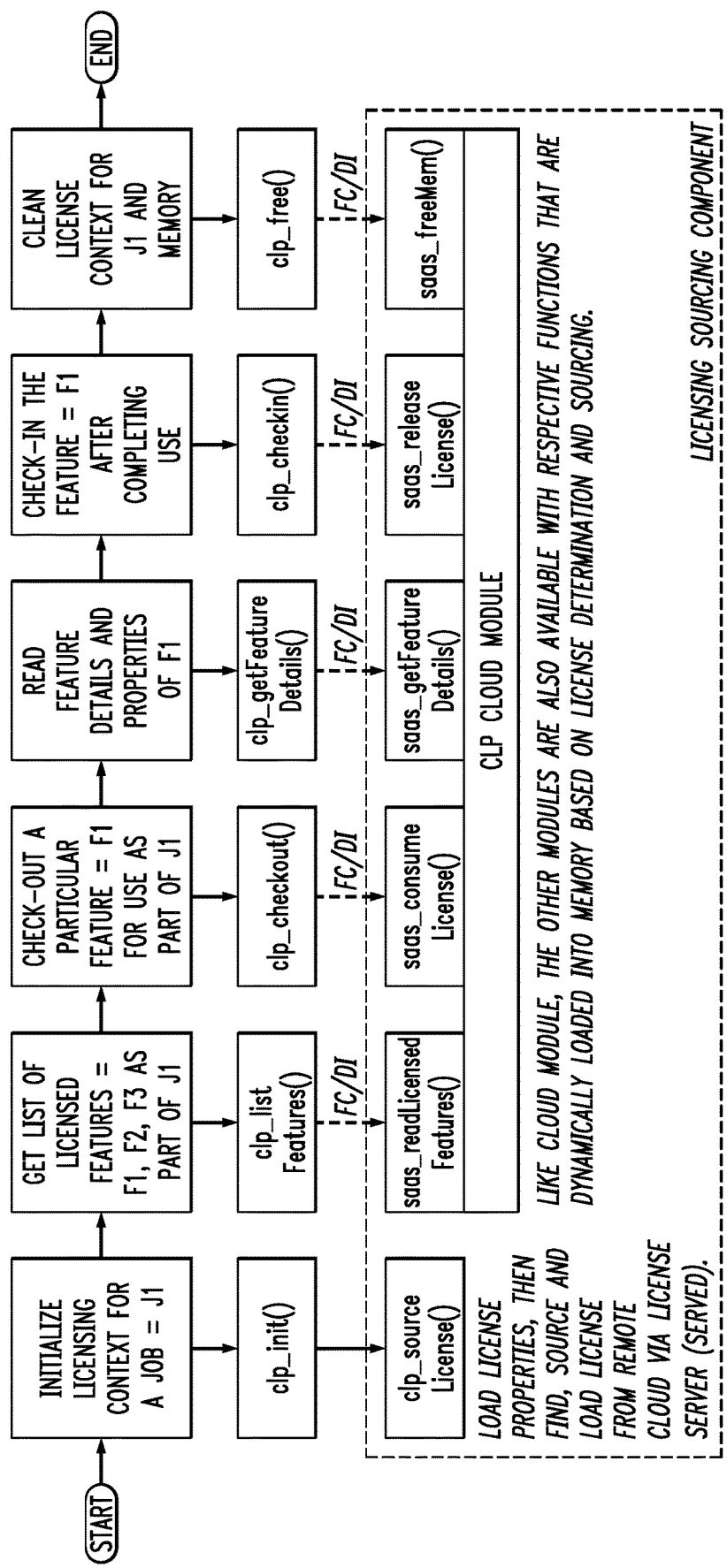
FIG. 7 is a flow diagram of an end-to-end flow for a feature-based licensing management implementation for a second scenario, according to an illustrative embodiment.

FIG. 7 depicts an end-to-end flow 700 for a second licensing management implementation, according to an illustrative embodiment. More particularly, end-to-end flow 700 is for license.technology="Cloud" and license.topology="Served". The example licensing transaction flow gives context of how licensing is used by product teams, and how different behaviors are executed based on license technology and topology. In this specific example, the Served Cloud licensing is initialized and sourced where the license transactions are sourced from Dell Cloud Licensing services via a delegating license server.

Figure 8:
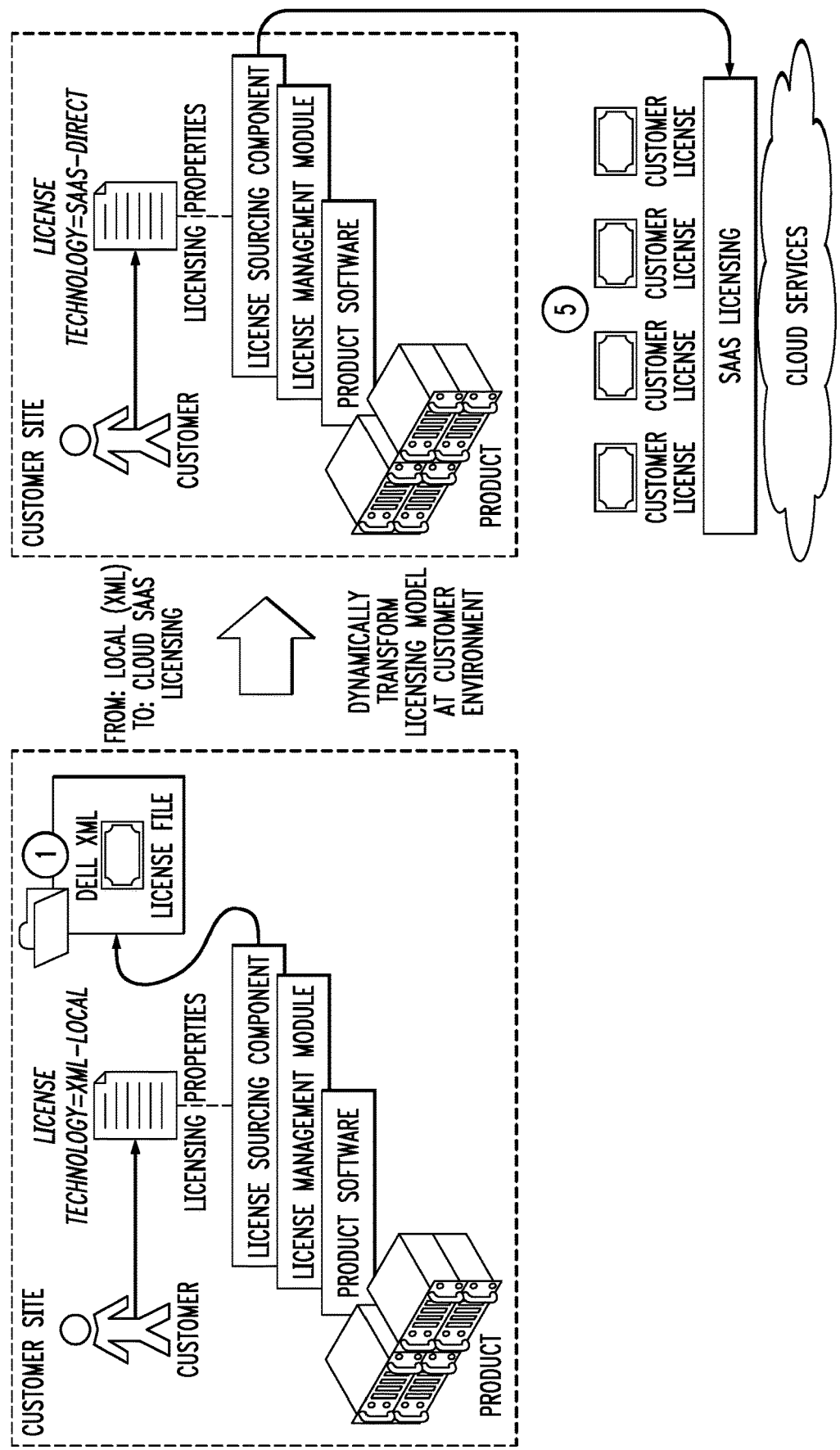
FIG. 8 is a block diagram of a first scenario where a licensing model is dynamically transformed at a customer computing environment, according to an illustrative embodiment.

FIG. 8 is a block diagram of a scenario 800 where a licensing model is dynamically transformed at a customer computing environment, according to one or more illustrative embodiments described herein. More particularly, scenario 800 shows product software at a customer site dynamically transforming from a local XML licensing model (recall licensing model 1 in FIG. 2) to a cloud SAAS licensing model (recall licensing model 5 in FIG. 2).

FIG. 9 is a block diagram of a scenario 900 where a licensing model is dynamically transformed at a customer computing environment, according to one or more illustrative embodiments described herein. More particularly, scenario 900 shows product software at a customer site dynamically transforming from a local XML licensing model (recall licensing model 1 in FIG. 2) to an XML license server licensing model (recall licensing model 3 in FIG. 2).

Figure 10:
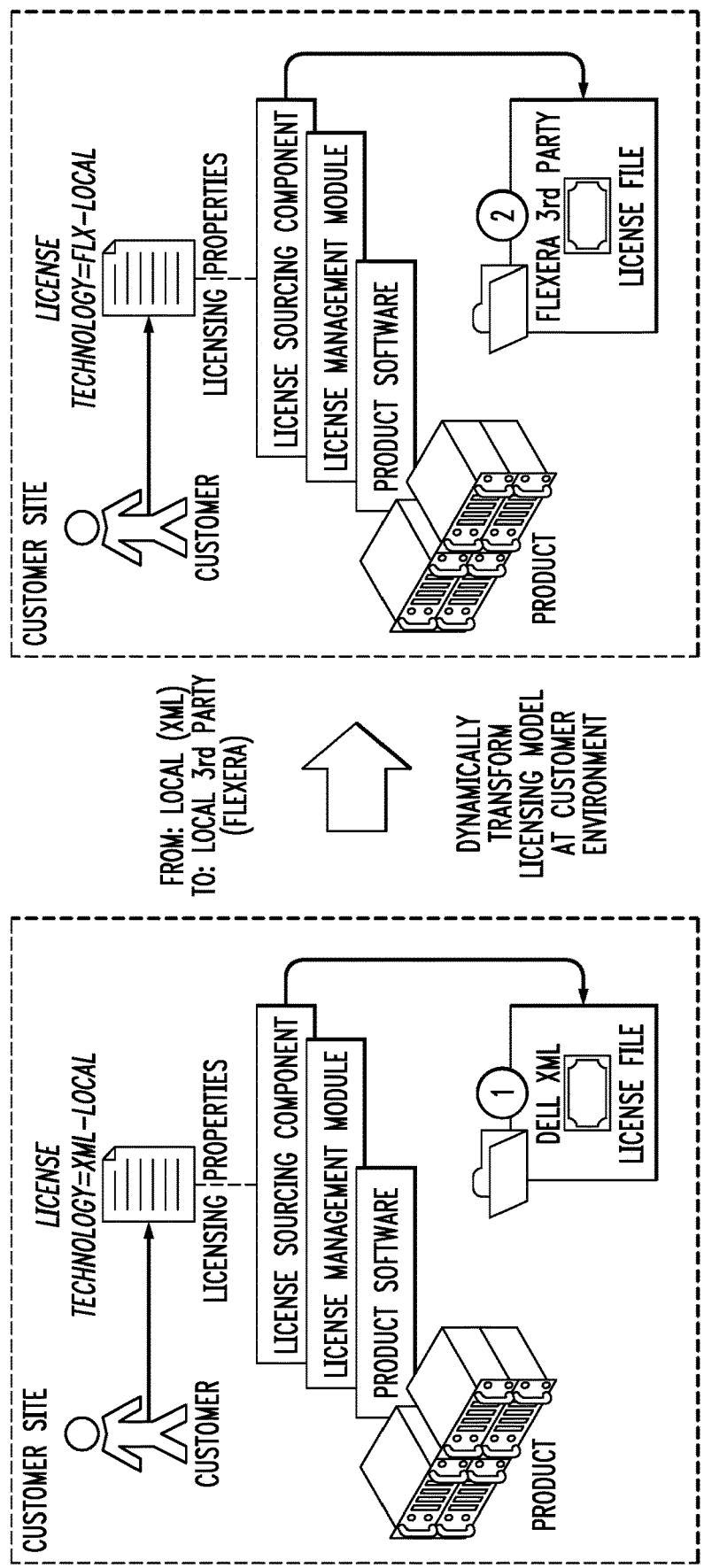
FIG. 10 is a block diagram of a third scenario where a licensing model is dynamically transformed at a customer computing environment, according to an illustrative embodiment.

FIG. 10 is a block diagram of a scenario 1000 where a licensing model is dynamically transformed at a customer computing environment, according to one or more illustrative embodiments described herein. More particularly, scenario 1000 shows product software at a customer site dynamically transforming from a local XML licensing model (recall licensing model 1 in FIG. 2) to a local $3^{rd}$ party (Flexera) licensing model (recall licensing model 2 in FIG. 2).

Figure 11:
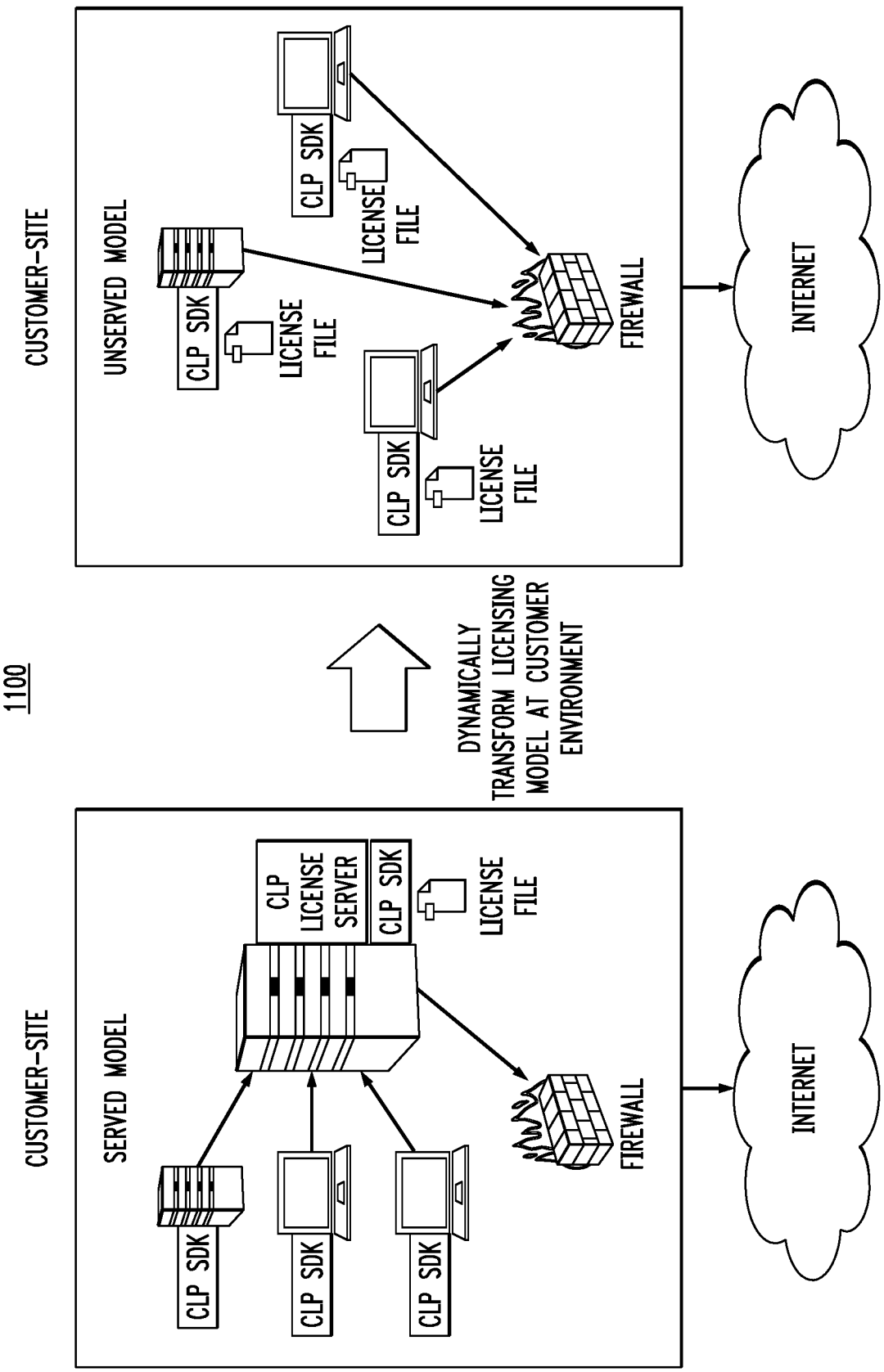
FIG. 11 is a block diagram of a fourth scenario where a licensing model is dynamically transformed at a customer computing environment, according to an illustrative embodiment.

FIG. 11 is a block diagram of a scenario 1100 where a licensing model is dynamically transformed at a customer computing environment, according to one or more illustrative embodiments described herein. In this example, the licensing model is transformed from a served model to an unserved model.

Figure 12:
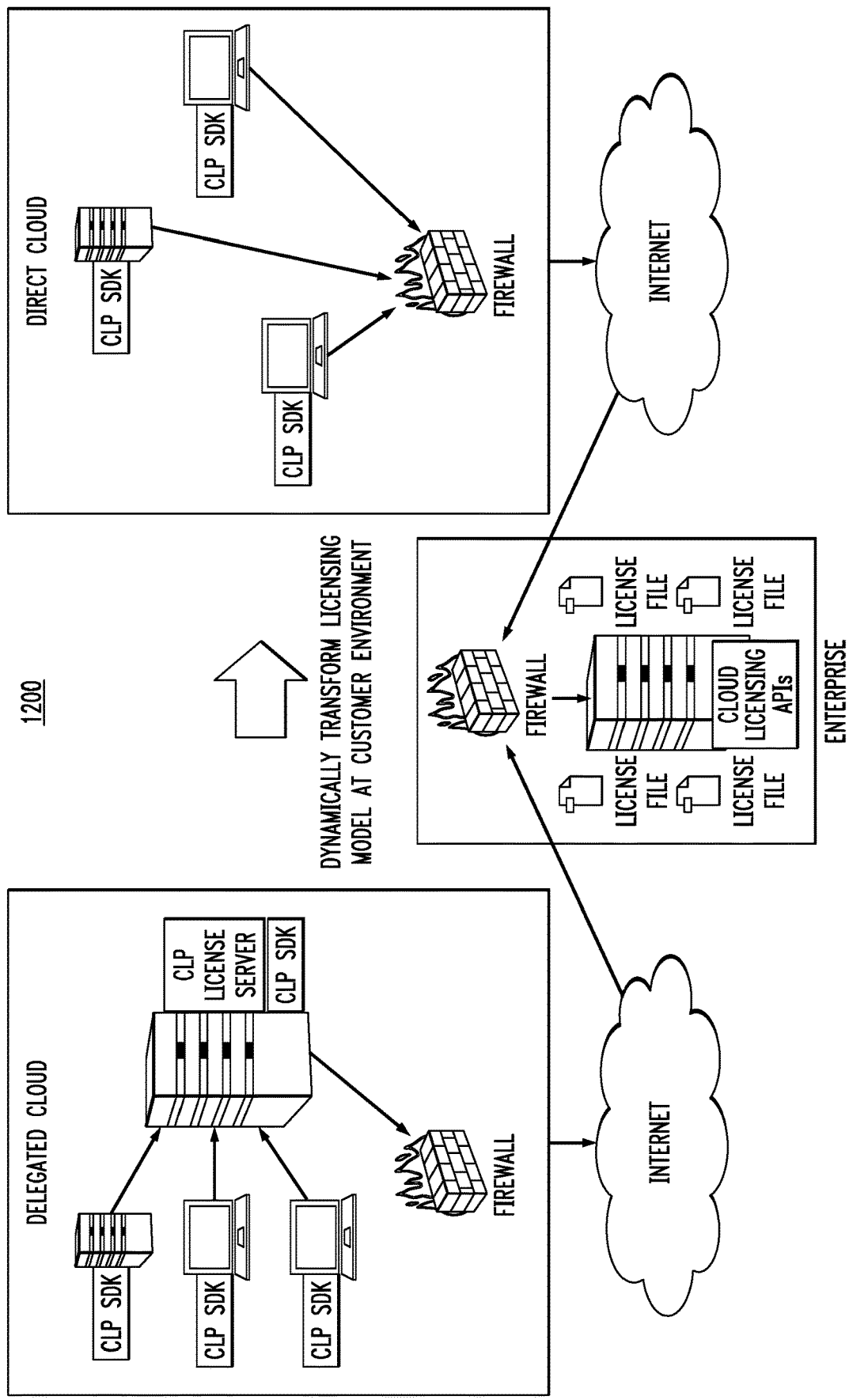
FIG. 12 is a block diagram of a fifth scenario where a licensing model is dynamically transformed at a customer computing environment, according to an illustrative embodiment.

FIG. 12 is a block diagram of a scenario 1200 where a licensing model is dynamically transformed at a customer computing environment, according to one or more illustrative embodiments described herein. In this example, the licensing model is transformed from a delegated cloud model to a direct cloud model.

Figure 13:
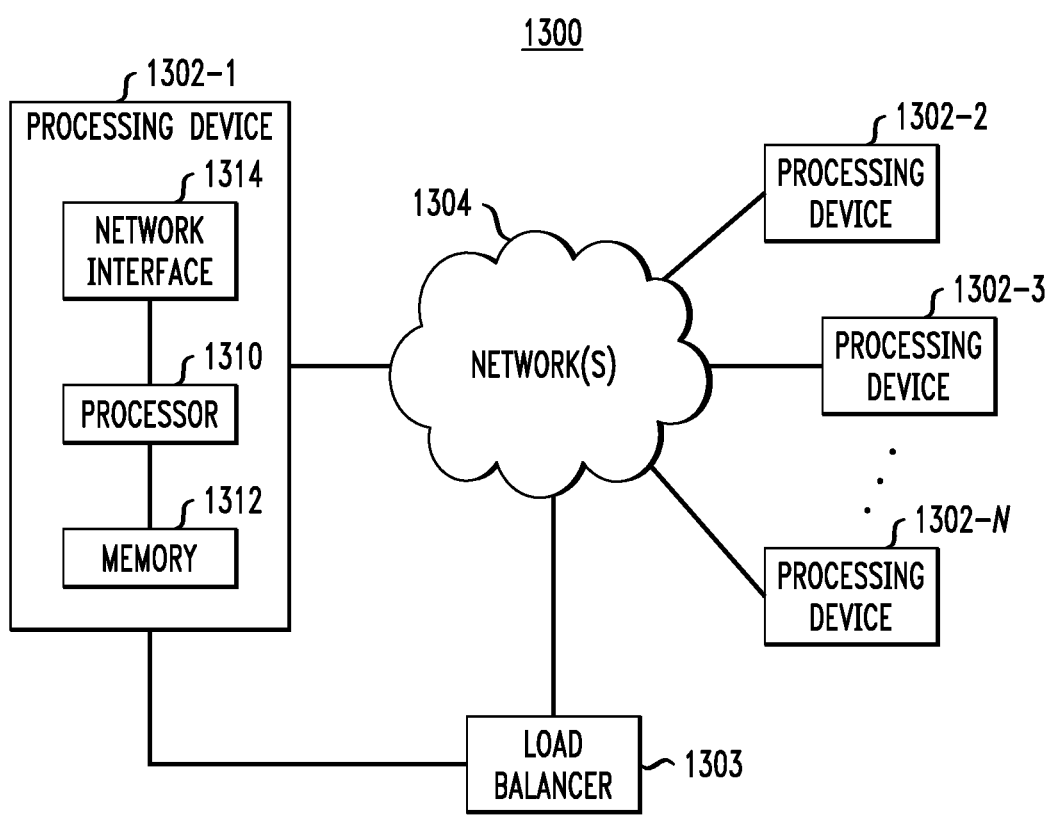
FIG. 13 illustrates a processing platform used to implement an architecture for providing dynamic license sourcing in a computing environment, according to an illustrative embodiment.

FIG. 13 illustrates a processing platform 1300 used to implement an architecture for providing dynamic license sourcing in a computing environment, according to an illustrative embodiment. More particularly, processing platform 1300 is a processing platform on which a computing environment with dynamic license sourcing functionalities (e.g., FIGS. 1-12 and otherwise described herein) can be implemented.

The processing platform 1300 in this embodiment comprises a plurality of processing devices, denoted 1302-1, 1302-2, 1302-3, . . . 1302-N, which communicate with one another over network(s) 1304. It is to be appreciated that the methodologies described herein may be executed in one such processing device 1302, or executed in a distributed manner across two or more such processing devices 1302 and load balanced to provide a high-availability environment. For example, as illustratively shown in FIG. 13, load balancer 1303 provides load balancing functionality between two or more of the plurality of processing devices 1302-1, 1302-2, 1302-3, . . . 1302-N. It is to be further appreciated that a server, a client device, a computing device or any other processing platform element may be viewed as an example of what is more generally referred to herein as a "processing device." As illustrated in FIG. 13, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1302 shown in FIG. 13. The network(s) 1304 represent one or more communications networks that enable components to communicate and to transfer data therebetween, as well as to perform other functionalities described herein.

The processing device 1302-1 in the processing platform 1300 comprises a processor 1310 coupled to a memory 1312. The processor 1310 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1310. Memory 1312 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1312 may comprise electronic memory such as random-access memory (RAM), read-only memory (ROM) or other types of memory, in any combination. The one or more software programs when executed by a processing device such as the processing device 1302-1 causes the device to perform functions associated with one or more of the components/steps of system/methodologies in FIGS. 1-12. One skilled in the art would be readily able to implement such software given the teachings provided herein. Other examples of processor-readable storage media embodying embodiments of the invention may include, for example, optical or magnetic disks.

Processing device 1302-1 also includes network interface circuitry 1314, which is used to interface the device with the networks 1304 and other system components. Such circuitry may comprise conventional transceivers of a type well known in the art.

The other processing devices 1302 (1302-2, 1302-3, . . . 1302-N) of the processing platform 1300 are assumed to be configured in a manner similar to that shown for computing device 1302-1 in the figure.

The processing platform 1300 shown in FIG. 13 may comprise additional known components such as batch processing systems, parallel processing systems, physical machines, virtual machines, virtual switches, storage volumes, etc. Again, the particular processing platform shown in this figure is presented by way of example only, and the system shown as 1300 in FIG. 13 may include additional or alternative processing platforms, as well as numerous distinct processing platforms in any combination.

Also, numerous other arrangements of servers, clients, computers, storage devices or other components are possible in processing platform 1300. Such components can communicate with other elements of the processing platform 1300 over any type of network, such as a wide area network (WAN), a local area network (LAN), a satellite network, a telephone or cable network, or various portions or combinations of these and other types of networks.

Furthermore, it is to be appreciated that the processing platform 1300 of FIG. 13 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1300 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-13 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method, comprising:
in a software product installed in a given computing environment, wherein the software product when installed is configured to operate in accordance with a licensing model having a first licensing functionality;
receiving an instruction to modify the licensing model to enable the software product to operate in accordance with a second licensing functionality; and
automatically modifying the licensing model to enable the software product to operate in accordance with the second licensing functionality;

wherein the given computing environment comprises a license sourcing component comprising a plurality of discrete memory blocks, each memory block of the plurality of discrete memory blocks specifying one of a plurality of different licensing transaction functions associated with one of a plurality of different licensing functionalities including the first licensing functionality and at least the second licensing functionality;

wherein automatically modifying the licensing model to enable the software product to operate in accordance with the second licensing functionality comprises:

monitoring for one or more licensing transactions called by the software product executing in the given computing environment;

determining an application context for the software product, the application context specifying the second licensing functionality;

dynamically selecting, for a given one of the one or more licensing transactions called by the software product executing in the given computing environment based at least in part on the determined application context, a given one of the plurality of different licensing transaction functions from a given one of the plurality of discrete memory blocks associated with the second licensing functionality;

utilizing at least one of dependency injection and one or more function pointer callbacks to load the given one of the one or more licensing transactions called by the software product from the given one of the plurality of discrete memory blocks; and executing the given one of the one or more licensing transactions called by the software product utilizing the given licensing transaction function specified by the given one of the plurality of discrete memory blocks; and wherein the receiving and modifying steps are executed by a processing device operatively coupled to a memory.

2. The method of claim 1, wherein the first licensing functionality and the second licensing functionality relate to two licensing technologies.

3. The method of claim 1, wherein the first licensing functionality and the second licensing functionality relate to two licensing topologies.

4. The method of claim 1, wherein a programmed behavior associated with the first licensing functionality for the given one of the one or more licensing transactions is stored in a first one of the plurality of discrete memory blocks and a programmed behavior associated with the second licensing functionality for the given one of the one or more licensing transactions is stored as the given one of the plurality of discrete memory blocks.

5. The method of claim 4, wherein the modifying step further comprises loading the programmed behavior from the given one of the plurality of discrete memory blocks associated with the second licensing functionality in response to a call for the given one of the one or more licensing transactions.

6. The method of claim 1, wherein the given computing environment is a customer site.

7. The method of claim 6, wherein automatically modifying the licensing model to enable the software product to operate in accordance with the second licensing functionality does not require communication outside the customer site.

8. The method of claim 1, wherein automatically modifying the licensing model to enable the software product to operate in accordance with the second licensing functionality comprises utilizing the dependency injection to load the given one of the one or more licensing transactions called by the software product from the given one of the plurality of discrete memory blocks.

9. The method of claim 1, wherein automatically modifying the licensing model to enable the software product to operate in accordance with the second licensing functionality comprises utilizing the one or more function pointer callbacks to load the given one of the one or more licensing transactions called by the software product from the given one of the plurality of discrete memory blocks.

10. An apparatus comprising:

a processing device operatively coupled to a memory and configured to:

in a software product installed in a given computing environment, wherein the software product when installed is configured to operate in accordance with a licensing model having a first licensing functionality;

receive an instruction to modify the licensing model to enable the software product to operate in accordance with a second licensing functionality; and automatically modify the licensing model to enable the software product to operate in accordance with the second licensing functionality;

wherein the given computing environment comprises a license sourcing component comprising a plurality of discrete memory blocks, each memory block of the plurality of discrete memory blocks specifying one of a plurality of different licensing transaction functions associated with one of a plurality of different licensing functionalities including the first licensing functionality and at least the second licensing functionality; and wherein automatically modifying the licensing model to enable the software product to operate in accordance with the second licensing functionality comprises:

monitoring for one or more licensing transactions called by the software product executing in the given computing environment;

determining an application context for the software product, the application context specifying the second licensing functionality;

dynamically selecting, for a given one of the one or more licensing transactions called by the software product executing in the given computing environment based at least in part on the determined application context, a given one of the plurality of different licensing transaction functions from a given one of the plurality of discrete memory blocks associated with the second licensing functionality;

utilizing at least one of dependency injection and one or more function pointer callbacks to load the given one of the one or more licensing transactions called by the software product from the given one of the plurality of discrete memory blocks; and executing the given one of the one or more licensing transactions called by the software product utilizing the given licensing transaction function specified by the given one of the plurality of discrete memory blocks.

11. The apparatus of claim 10, wherein the first licensing functionality and the second licensing functionality relate to two licensing technologies.

12. The apparatus of claim 10, wherein the first licensing functionality and the second licensing functionality relate to two licensing topologies.

13. The apparatus of claim 10, wherein a programmed behavior associated with the first licensing functionality for the given licensing transaction is stored in a first one of the plurality of discrete memory blocks and a programmed behavior associated with the second licensing functionality for the given one of the one or more licensing transactions is stored in the given one of the plurality of discrete memory blocks.

14. The apparatus of claim 13, wherein the processing device is further configured to modify the software product by loading the programmed behavior from the given one of the plurality of discrete memory blocks associated with the second licensing functionality in response to a call for the given one of the one or more licensing transactions.

15. The apparatus of claim 10, wherein the given computing environment is a customer site.

16. An article of manufacture comprising a non-transitory processor-readable storage medium having stored therein program code of one or more software programs, wherein the program code when executed by at least one processing device causes said at least one processing device to perform steps of:
  in a software product installed in a given computing environment, wherein the software product when installed is configured to operate in accordance with a licensing model having a first licensing functionality;
  receiving an instruction to modify the licensing model to enable the software product to operate in accordance with a second licensing functionality; and
  automatically modifying the licensing model to enable the software product to operate in accordance with the second licensing functionality;
  wherein the given computing environment comprises a license sourcing component comprising a plurality of discrete memory blocks, each memory block of the plurality of discrete memory blocks specifying one of a plurality of different licensing transaction functions associated with one of a plurality of different licensing functionalities including the first licensing functionality and at least the second licensing functionality; and
  wherein automatically modifying the licensing model to enable the software product to operate in accordance with the second licensing functionality comprises:
    monitoring for one or more licensing transactions called by the software product executing in the given computing environment;
    determining an application context for the software product, the application context specifying the second licensing functionality;
    dynamically selecting, for a given one of the one or more licensing transactions called by the software product executing in the given computing environment based at least in part on the determined application context, a given one of the plurality of different licensing transaction functions from a given one of the plurality of discrete memory blocks associated with the second licensing functionality;
    utilizing at least one of dependency injection and one or more function pointer callbacks to load the given one of the one or more licensing transactions called by the software product from the given one of the plurality of discrete memory blocks; and
    executing the given one of the one or more licensing transactions called by the software product utilizing the given licensing transaction function specified by the given one of the plurality of discrete memory blocks.

17. The article of claim 16, wherein the first licensing functionality and the second licensing functionality relate to two licensing technologies.

18. The article of claim 16, wherein the first licensing functionality and the second licensing functionality relate to two licensing topologies.

19. The article of claim 16, wherein a programmed behavior associated with the first licensing functionality for the given one of the one or more licensing transactions is stored in a first one of the plurality of discrete memory blocks and a programmed behavior associated with the second licensing functionality for the given one of the one or more licensing transactions is stored as the given one of the plurality of discrete memory blocks.

20. The article of claim 19, wherein the modifying step further comprises loading the programmed behavior from the given one of the plurality of discrete memory blocks associated with the second licensing functionality in response to a call for the given one of the one or more licensing transactions.

* * * * *